US012700742B2

(12) United States Patent
Lee et al.

(10) Patent No.: US 12,700,742 B2
(45) Date of Patent: Aug. 4, 2026

(54) ELECTRONIC DEVICE FOR SUPPORTING FAST BATTERY CHARGING

(71) Applicant: Samsung Electronics Co., Ltd., Suwon-si (KR)

(72) Inventors: Kyungmin Lee, Suwon-si (KR); Dongzo Kim, Suwon-si (KR); Mincheol Ha, Suwon-si (KR); Yunjeong Noh, Suwon-si (KR); Keyic Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 644 days.

(21) Appl. No.: 18/173,432

(22) Filed: Feb. 23, 2023

(65) Prior Publication Data

US 2023/0402853 A1      Dec. 14, 2023

Related U.S. Application Data

(63) Continuation of application No. PCT/KR2023/001801, filed on Feb. 8, 2023.

(30) Foreign Application Priority Data

Jun. 14, 2022   (KR) ........................ 10-2022-0071907
Aug. 3, 2022   (KR) ........................ 10-2022-0096917

(51) Int. Cl.
H02J 7/00          (2006.01)
H02J 7/47          (2026.01)
(Continued)

(52) U.S. Cl.
CPC ................ H02J 7/47 (2026.01); H02J 50/12 (2016.02); H02J 50/80 (2016.02)

(58) Field of Classification Search
CPC ........ H02J 7/00045; H02J 50/12; H02J 50/80; H02J 7/00034; H02J 50/10
See application file for complete search history.

(56) References Cited

U.S. PATENT DOCUMENTS 10,063,112 B2 *   8/2018   Tachiwa .................. H02J 50/90
10,110,030 B1   10/2018   Colosimo et al.
(Continued)

FOREIGN PATENT DOCUMENTS

JP        2007-089341 A      4/2007
JP        2015-035842 A      2/2015
(Continued)

OTHER PUBLICATIONS

International Search Report dated May 23, 2023, issued in International Patent Application No. PCT/KR2023/001801.

*Primary Examiner* — Nha T Nguyen
(74) *Attorney, Agent, or Firm* — Jefferson IP Law, LLP

(57) ABSTRACT

A power supply device is provided. The power supply device includes an authentication circuit, power supply circuits, and a control circuit connected to the authentication circuit and the power supply circuits. Each of the power supply circuits includes a coil and a communication circuit and may be configured to transmit a power signal to one power reception device through the coil. The control circuit performs an authentication operation for fast charging of a plurality of power reception devices without a collision by using the authentication circuit and the power supply circuits.

13 Claims, 12 Drawing Sheets

(51) Int. Cl.
  *H02J 50/12* (2016.01)
  *H02J 50/80* (2016.01)

(56) References Cited

U.S. PATENT DOCUMENTS

| | | | |
|---|---|---|---|
| 10,135,284 B2 | 11/2018 | Park et al. | |
| 10,673,541 B2 | 6/2020 | Nimmala et al. | |
| 10,959,096 B2 | 3/2021 | Park | |
| 10,998,749 B2 | 5/2021 | Rahman et al. | |
| 11,664,852 B2 | 5/2023 | Park et al. | |
| 2010/0253281 A1 | 10/2010 | Li | |
| 2011/0136550 A1 | 6/2011 | Maugars | |
| 2013/0234661 A1* | 9/2013 | Yang | H04W 12/06 |
| | | | 320/108 |
| 2013/0278209 A1 | 10/2013 | Von et al. | |
| 2019/0021001 A1* | 1/2019 | Park | H02J 50/70 |
| 2019/0068005 A1 | 2/2019 | Wang et al. | |
| 2020/0021137 A1* | 1/2020 | Kato | H02J 50/80 |
| 2020/0091779 A1 | 3/2020 | Lee et al. | |
| 2020/0266665 A1* | 8/2020 | Noh | H02J 7/00045 |
| 2020/0266675 A1* | 8/2020 | Lee | H02J 7/00034 |
| 2022/0052562 A1* | 2/2022 | Park | H02J 50/80 |
| 2024/0204581 A1* | 6/2024 | Sakamoto | H02J 50/80 |
| 2025/0150822 A1* | 5/2025 | Youn | H02J 50/80 |
| 2025/0286411 A1* | 9/2025 | Youn | H02J 50/12 |

FOREIGN PATENT DOCUMENTS

| | | |
|---|---|---|
| JP | 5681167 B2 | 3/2015 |
| JP | 2016-136794 A | 7/2016 |
| KR | 10-2012-0068412 A | 6/2012 |
| KR | 10-1501485 B1 | 3/2015 |
| KR | 10-1752250 B1 | 7/2017 |
| KR | 10-2019-0006852 A | 1/2019 |
| KR | 10-2019-0087995 A | 7/2019 |
| KR | 10-2019-0098632 A | 8/2019 |
| KR | 10-2019-0138631 | 12/2019 |
| KR | 10-2068436 B1 | 1/2020 |
| KR | 10-2020-0033053 A | 3/2020 |
| KR | 10-2020-0082840 A | 7/2020 |
| KR | 10-2129700 B1 | 7/2020 |
| KR | 10-2020-0101193 A | 8/2020 |
| KR | 10-2199192 B1 | 1/2021 |
| KR | 10-2022-0006806 A | 1/2022 |

* cited by examiner

FIG. 2
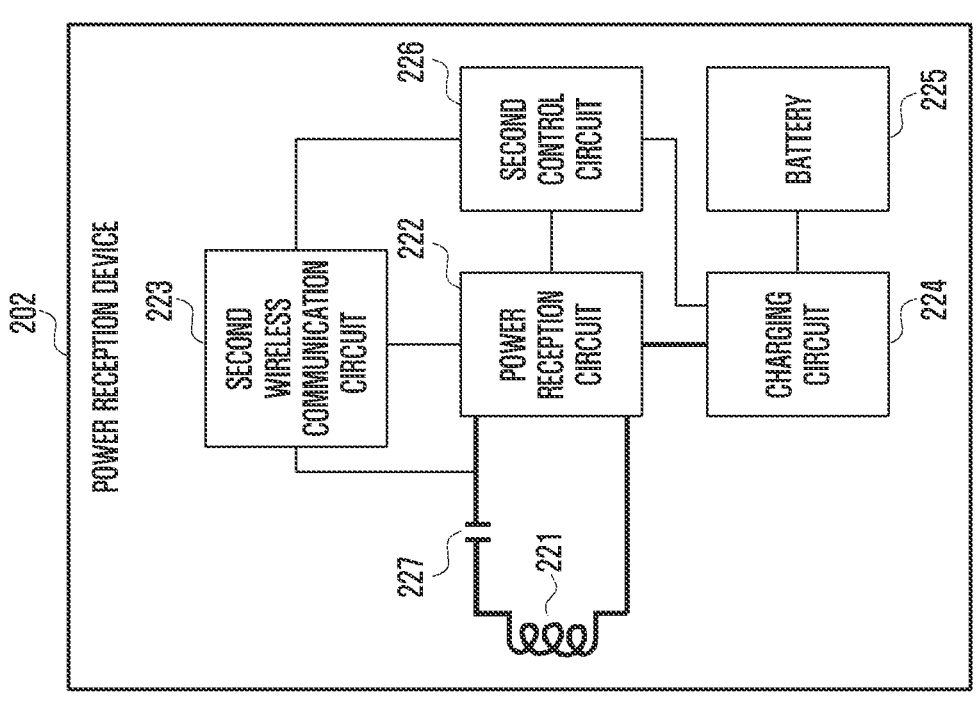
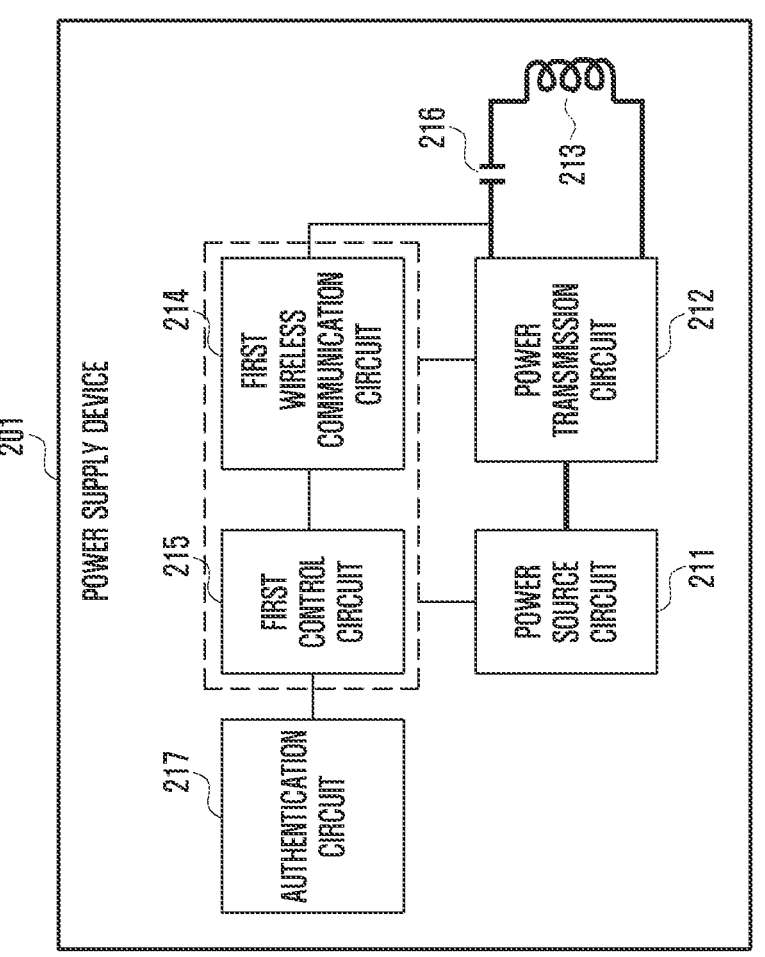

FIG. 9

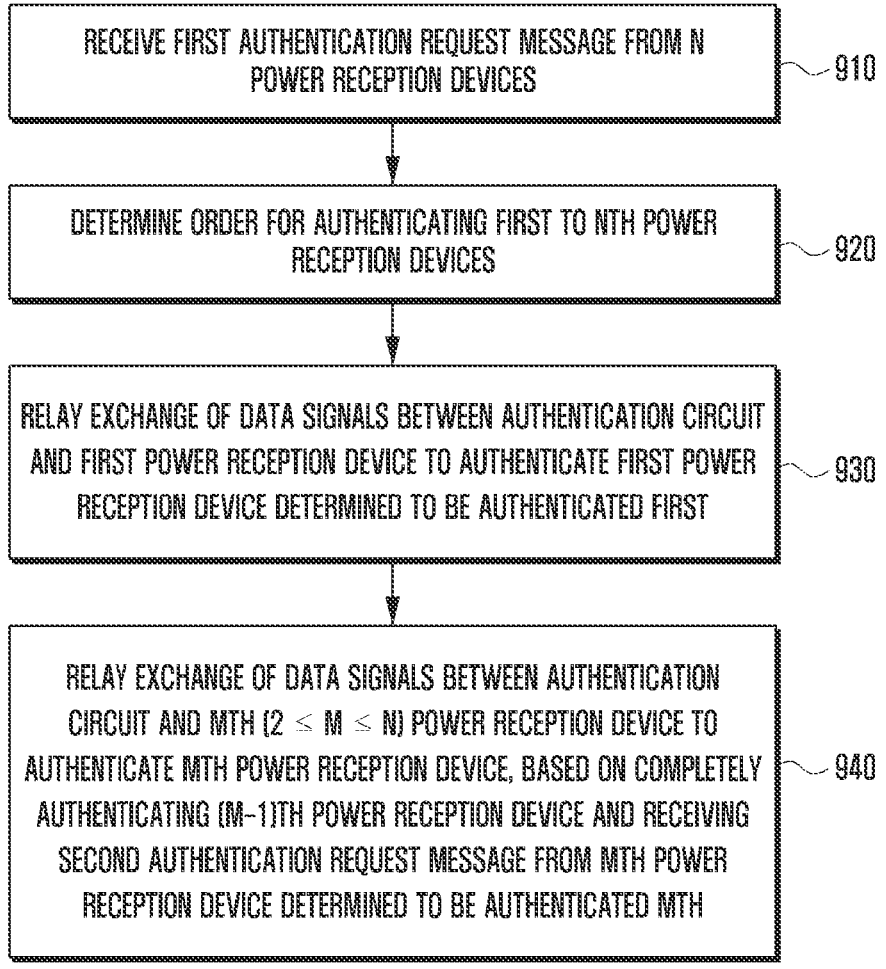

RECEIVE FIRST AUTHENTICATION REQUEST MESSAGE FROM N POWER RECEPTION DEVICES — 910

DETERMINE ORDER FOR AUTHENTICATING FIRST TO NTH POWER RECEPTION DEVICES — 920

RELAY EXCHANGE OF DATA SIGNALS BETWEEN AUTHENTICATION CIRCUIT AND FIRST POWER RECEPTION DEVICE TO AUTHENTICATE FIRST POWER RECEPTION DEVICE DETERMINED TO BE AUTHENTICATED FIRST — 930

RELAY EXCHANGE OF DATA SIGNALS BETWEEN AUTHENTICATION CIRCUIT AND MTH $(2 \leq M \leq N)$ POWER RECEPTION DEVICE TO AUTHENTICATE MTH POWER RECEPTION DEVICE, BASED ON COMPLETELY AUTHENTICATING $(M-1)$TH POWER RECEPTION DEVICE AND RECEIVING SECOND AUTHENTICATION REQUEST MESSAGE FROM MTH POWER RECEPTION DEVICE DETERMINED TO BE AUTHENTICATED MTH — 940

FIG. 10

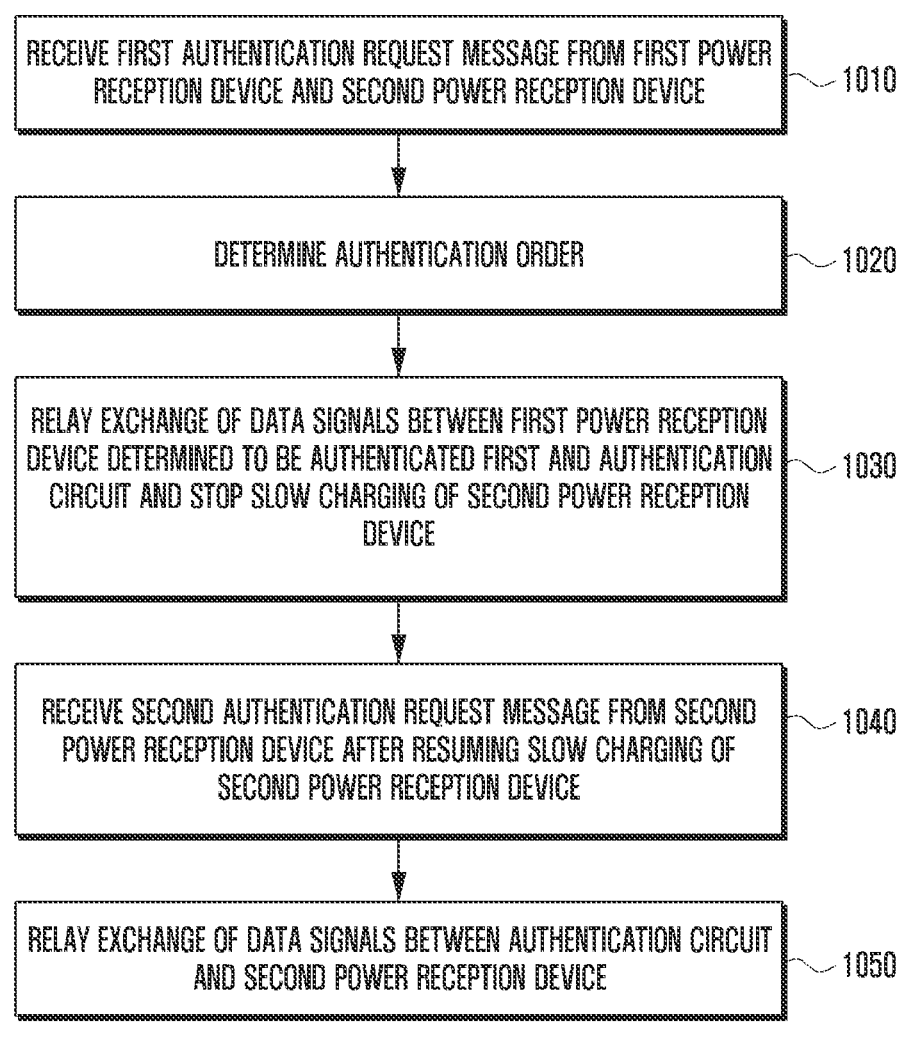

RECEIVE FIRST AUTHENTICATION REQUEST MESSAGE FROM FIRST POWER RECEPTION DEVICE AND SECOND POWER RECEPTION DEVICE ~ 1010

DETERMINE AUTHENTICATION ORDER ~ 1020

RELAY EXCHANGE OF DATA SIGNALS BETWEEN FIRST POWER RECEPTION DEVICE DETERMINED TO BE AUTHENTICATED FIRST AND AUTHENTICATION CIRCUIT AND STOP SLOW CHARGING OF SECOND POWER RECEPTION DEVICE ~ 1030

RECEIVE SECOND AUTHENTICATION REQUEST MESSAGE FROM SECOND POWER RECEPTION DEVICE AFTER RESUMING SLOW CHARGING OF SECOND POWER RECEPTION DEVICE ~ 1040

RELAY EXCHANGE OF DATA SIGNALS BETWEEN AUTHENTICATION CIRCUIT AND SECOND POWER RECEPTION DEVICE ~ 1050

TRANSMIT FIRST AUTHENTICATION REQUEST MESSAGE TO POWER SUPPLY DEVICE ~1110

RECEIVE RETRANSMISSION REQUEST MESSAGE FROM POWER SUPPLY DEVICE ~1120

TRANSMIT SECOND AUTHENTICATION REQUEST MESSAGE TO POWER SUPPLY ~1130

ELECTRONIC DEVICE FOR SUPPORTING FAST BATTERY CHARGING

CROSS-REFERENCE TO RELATED APPLICATION(S)

This application is a continuation application, claiming priority under § 365(c), of an International application No. PCT/KR2023/001801, filed on Feb. 8, 2023, which is based on and claims the benefit of a Korean patent application number 10-2022-0071907 filed on Jun. 14, 2022, in the Korean Intellectual Property Office, and of a Korean patent application number 10-2022-0096917, filed on Aug. 3, 2022, in the Korean Intellectual Property Office, the disclosure of each of which is incorporated by reference herein in its entirety.

TECHNICAL FIELD

The disclosure relates to an electronic device for performing authentication to wirelessly charge a battery at a high speed.

BACKGROUND ART

A battery may be wirelessly charged using a coil in a wireless charging system. With a reception coil of a portable power reception device (e.g., a smartphone, a smartwatch, a wireless earphone charging case (or cradle), and the like) being close to a transmission coil of a power supply device, the portable power reception device may charge a battery by using a power signal received from the power supply device through the reception coil.

The power reception device may receive a data signal (e.g., a ping signal) from the power supply device through the coil. The power reception device may determine whether the power supply device is a model supporting fast charging, based on a data signal received from the power supply device. When the power supply device is identified as a model capable of supporting fast charging, the power reception device may perform an authentication operation with the power supply device through wireless communication. The power supply device may identify whether the power reception device is a target for fast charging through the authentication operation. When the power reception device is identified as a target for fast charging, the power supply device may transmit a power signal having a designated power value to the power reception device. The power supply device may transmit a power signal having a higher power value than a power value of a power signal transmitted before the power reception device is authenticated to the power reception device. The power reception device may charge the battery at a high speed by using the received power signal.

The above information is presented as background information only to assist with an understanding of the disclosure. No determination has been made, and no assertion is made, as to whether any of the above might be applicable as prior art with regard to the disclosure.

DISCLOSURE

Technical Problem

An authentication operation for fast wireless charging may be started by a power reception device first transmitting an authentication request message to a power supply device.

The power supply device may respond to an authentication request by using an authentication circuit (e.g., a secure Integrated circuit (IC)). When a response to the authentication request is not received from the power supply device, the power reception device does not request authentication again, and thus authentication may be regarded as a failure.

In a wireless charging system in which a power supply device corresponds to a power reception device one-to-one, a probability of authentication failure may be low. However, in a wireless charging system in which a plurality of power reception devices are connectable to one power supply device, a probability of failure may be relatively high. When the plurality of power reception devices simultaneously requests authentication from the power supply device, a collision may occur between authentication request messages. Due to this collision, the power supply device may transmit a response message to only one reception device. A power reception device that fails to receive a response is regarded as an unauthenticated device, and thus battery charging in the power reception device that fails to receive a response may take a relatively long time.

As many authentication circuits as a number of power reception devices connectable to a power supply may be provided in the power supply device, thereby separately authenticating all power reception devices connected to the power supply device. However, costs may increase according to the number of required authentication circuits, and hardware complexity may increase.

Aspects of the disclosure are to address at least the above-mentioned problems and/or disadvantages and to provide at least the advantages described below. Accordingly, an aspect of the disclosure is to provide a power supply device that performs an authentication operation for a plurality of power reception devices without a collision by using one authentication circuit. Accordingly, all power reception devices wirelessly connected to the power supply device may charge a battery at a high speed.

Additional aspects will be set forth in part in the description which follows and, in part, will be apparent from the description, or may be learned by practice of the presented embodiments.

Technical Solution

In accordance with an aspect of the disclosure, a power supply device is provided. The power supply device includes an authentication circuit, power supply circuits, and a control circuit connected to the authentication circuit and the power supply circuits. Each of the power supply circuits may include a coil and a communication circuit and may be configured to transmit a power signal to one power reception device through the coil. The control circuit may be configured to transmit and receive a data signal to and from the one power reception device through the communication circuit. The control circuit may receive a first authentication request message for fast charging from a first power reception device and a second power reception device. The control circuit may determine the first power reception device as a target to be authenticated first and the second power reception device as a target to be authenticated second, based on receiving the first authentication request message from the first power reception device and the second power reception device. The control circuit may relay an exchange of a data signal between the authentication circuit and the first power reception device to authenticate the first power reception device. The control circuit may transmit a message for requesting transmission of a second authentication request message for fast charging to the second power reception device while maintaining transmission of a power signal from a power supply circuit to the second power reception device, based on completely authenticating the first power reception device. The control circuit may relay an exchange of a data signal between the authentication circuit and the second power reception device to authenticate the second power reception device, based on receiving the second authentication request message from the second power reception device.

In accordance with another aspect of the disclosure, a power reception device is provided. The power reception device includes a battery, a charging circuit configured to charge the battery, a coil, a power reception circuit configured to transmit a power signal received from a power supply device through the coil to the charging circuit, a communication circuit configured to perform data communication with the power supply device through the coil, and a control circuit configured to be connected to the charging circuit, the power reception circuit, and the communication circuit. The control circuit may transmit a first authentication request message for requesting authentication for fast charging to the power supply device through the communication circuit, based on identifying that the power supply device supports fast charging from identification information about the power supply device received through the communication circuit. The control circuit may receive a retransmission request message for requesting a re-request for authentication from the power supply device through the communication circuit after transmitting the first authentication request message. The control circuit may transmit a second authentication request message to the power supply device through the communication circuit in response to the retransmission request message.

In accordance with another aspect of the disclosure, a power reception device is provided. The power reception device includes a battery, a charging circuit configured to charge the battery, a coil, a power reception circuit configured to transmit a power signal received from a power supply device through the coil to the charging circuit, a communication circuit configured to perform data communication with the power supply device through the coil, and a control circuit configured to be connected to the charging circuit, the power reception circuit, and the communication circuit. The control circuit may transmit a first authentication request message for requesting authentication for fast charging to the power supply device through the communication circuit, based on identifying that the power supply device supports fast charging from identification information about the power supply device received through the communication circuit. The control circuit may transmit a second authentication request message to the power supply device through the communication circuit when there is no response from the power supply device within a designated time after transmitting the first authentication request message.

In accordance with another aspect of the disclosure, a power supply device is provided. The power supply device includes an authentication circuit and power supply circuits, each of the power supply circuits may include a coil and a communication circuit and may be configured to transmit a power signal to one power reception device through the coil, and a method for operating the power supply device may include receiving a first authentication request message for fast charging from a first power reception device through a communication circuit of a first power supply circuit among the power supply circuits and from a second power reception device through a communication circuit of a second power supply circuit. The method may include determining the first power reception device as a target to be authenticated first and the second power reception device as a target to be authenticated second, based on receiving the first authentication request message from the first power reception device and the second power reception device. The method may include relaying an exchange of a data signal between the authentication circuit and the first power reception device to authenticate the first power reception device. The method may include transmitting a message for requesting transmission of a second authentication request message for fast charging to the second power reception device while maintaining transmission of a power signal from the second power supply circuit to the second power reception device, based on completely authenticating the first power reception device. The method may include relaying an exchange of a data signal between the authentication circuit and the second power reception device to authenticate the second power reception device, based on receiving the second authentication request message from the second power reception device.

Advantageous Effects

According to various embodiments, a plurality of power reception devices may be authenticated without a collision, thus charging all of the plurality of power reception devices at a high speed. Authentication may be implemented through one authentication circuit. Therefore, a reduction in costs and hardware simplification may be expected. In addition, various effects directly or indirectly identified through this document may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 2 illustrates a wireless charging system according to an embodiment of the disclosure;

FIG. 9 is a flowchart illustrating operations of a multi-power supply device according to an embodiment of the disclosure;

FIG. 10 is a flowchart illustrating operations of a multi-power supply device according to an embodiment of the disclosure;

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
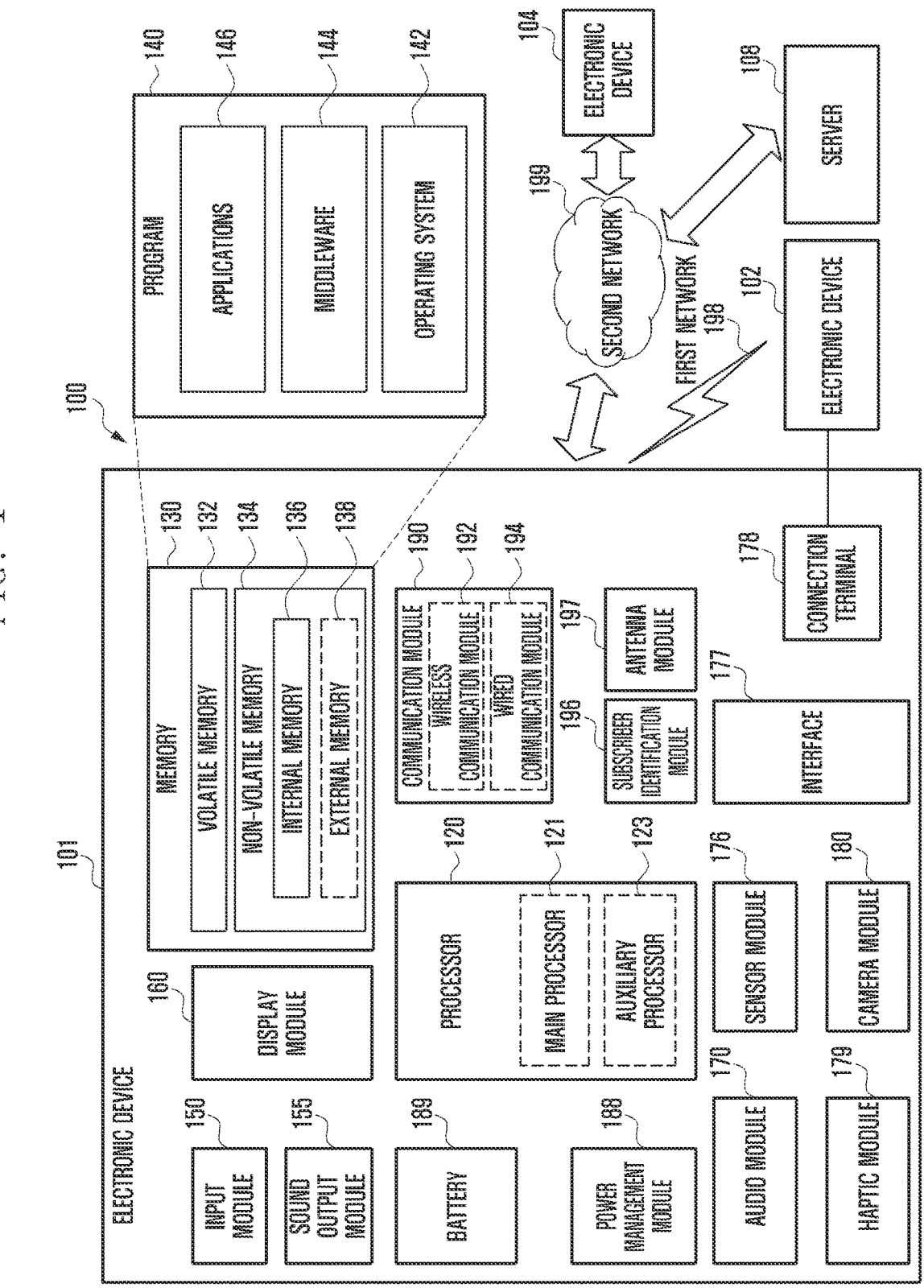
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). In an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In other embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. In one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. In another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, communication processor (CP), and the like) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. In another example, the auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. In an embodiment, the artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. In an embodiment, the memory 130 may include the volatile memory 132 or the non-volatile memory 134.

The program 140 may be stored in the memory 130 as software, and may include an operating system (OS) 142, middleware 144, or an application 146.

The input module 150 may receive a command or data to be used by another component (e.g., the processor 120) of the electronic device 101, from the outside (e.g., a user) of the electronic device 101. In another embodiment, the input module 150 may include, for example, a microphone, a mouse, a keyboard, a key (e.g., a button), digital pen (e.g., a stylus pen), and the like.

The sound output module 155 may output sound signals to the outside of the electronic device 101. The sound output module 155 may include, for example, a speaker or a receiver. In an embodiment, the speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. In an embodiment, the display module 160 may include a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to another embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one embodiment, the haptic module 179 may include a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. In one embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. In an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. In another embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. In an embodiment, the wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. In another embodiment, the wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may be configured to transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to some embodiments, the antenna module 197 may form a mmWave antenna module. According to other embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. In another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. In an embodiment, the electronic device 101 may provide the outcome, with or without further processing of the outcome, as at least part of a reply to the request. To that end, a cloud computing, distributed computing, mobile edge computing (MEC), or client-server computing technology may be used, for example. In another embodiment, the electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include a portable communication device (e.g., a smartphone), a computer device, a portable multimedia device, a portable medical device, a camera, a wearable device, or a home appliance. In an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". In an embodiment, a module may be a single integral component, or a minimum unit or part thereof, adapted to perform one or more functions. According to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). In an example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to yet other embodiments, operations performed by the module, the program, or another component may be carried out sequentially, in parallel, repeatedly, or heuristically, or one or more of the operations may be executed in a different order or omitted, or one or more other operations may be added.

FIG. 2 illustrates a wireless charging system according to an embodiment of the disclosure. A power supply device (e.g., an electronic device 102 of FIG. 1) 201 may wirelessly transmit a power signal. A power reception device (e.g., an electronic device 101 of FIG. 1) 202 may wirelessly receive a power signal.

A wireless charging system may perform wireless charging (e.g., general wireless charging), based on a designated protocol. For example, according to the WPC standard, a wireless charging operation may include a ping operation, an identification and configuration operation, and a power transfer operation. In an embodiment, the ping operation may include an operation of identifying whether the power reception device 202 is mounted on a charging pad of the power supply device 201. The identification and configuration operation may include an operation of configuring a power value of a power signal to be transmitted to the power reception device 202 through data communication between the power supply device 201 and the power reception device 202. In another embodiment, the power transfer operation may include an operation of the power supply device 201 transmitting the power signal having the power value configured in the identification and configuration operation to the power reception device 202.

According to yet another embodiment, the power supply device 201 may include a power source circuit 211, a power transmission circuit 212, a first coil (or power transmission coil) 213, a first wireless communication circuit 214, and a first control circuit (or power transmission control circuit) 215.

The power source circuit 211 may provide the power transmission circuit 212 with a power signal to be transmitted to the power reception device 202. In an example, the power source circuit 211 may include an adapter to convert the current of a power signal transmitted from the outside from an alternating current (AC) to a direct current (DC) and to regulate the voltage of power into a designated voltage value, based on control of the first control circuit 215, to output the voltage value.

In an embodiment, the power transmission circuit 212 may be configured to convert the current of the power signal received from the power source circuit 211 from a DC to an AC to wirelessly transmit the power signal through the first coil 213. The power transmission circuit 212 may include an inverter circuit (e.g., a full-bridge circuit) configured to periodically change the direction of a current. The first coil 213 may resonate at a specific frequency. For example, the power supply device 201 may further include a resonant circuit 216 to enable the first coil 213 to resonate at the specific frequency (e.g., a frequency specified in the Wireless Power Consortium (WPC) standard). In another embodiment, the inverter circuit may periodically convert the current direction of a first power signal received from the power source circuit 211 according to a resonant frequency of the first coil 213, thereby generating a second power signal having the resonant frequency and outputting the second power signal to the first coil 213. Accordingly, the second power signal may be wirelessly transmitted to the power reception device 202 through the first coil 213. The power transmission circuit 212 may include a current regulation circuit (e.g., a low-dropout (LDO) regulator) to regulate the current of the second power signal and to transmit the second power signal to the first coil 213, based on control of the first control circuit 215.

In yet another embodiment, the first coil 213 may be, for example, a spiral coil wound a plurality times in a clockwise or counterclockwise direction on an axis perpendicular to a plane on which the power reception device 202 is mounted in the charging pad of the power supply device 201. A power signal may be supplied from the power supply device 201 to the power reception device 202 by electrical coupling of coils 213 and 221. In still another embodiment, the first coil 213 may be used as an antenna for data communication (e.g., in-band communication) in addition to power transmission.

The first wireless communication circuit 214 may perform data communication with the power reception device 202 through the first coil 213. The first wireless communication circuit 214 may receive a data signal from the first control circuit 215, may load the received data signal onto a power signal to be supplied to the power reception device 202, and may transmit the power signal to a second wireless communication circuit 223 of the power reception device 202. As a method for loading the data signal onto the power signal, for example, a technique of modulating the amplitude and/or frequency of the power signal may be used. In an embodiment, the first wireless communication circuit 214 may demodulate the power signal transmitted from the first coil 213 to the second coil 221, thus obtaining a data signal transmitted from the second coil 221 of the power reception device 202 to the first coil 213 of the power supply device 201. The first wireless communication circuit 214 may transmit the obtained data signal to the first control circuit 215.

In another embodiment, the first control circuit (e.g., a microcontroller unit (MCU)) 215 may be configured together with a memory (not shown) as one chipset. The first control circuit 215 may control power delivery, based on information received from the power reception device 202 through the first wireless communication circuit 214. In an example, the first control circuit 215 may control the power transmission circuit 212 to periodically transmit a power signal (e.g., a ping signal or wake-up signal) for detecting an external object (e.g., the power reception device 202). In another embodiment, the power supply device 201 may monitor a change in characteristic (e.g., a frequency or amplitude) of the power signal through the first wireless communication circuit 214, and may recognize that there is an object adjacent to the power supply device 201, based on the change in characteristic. A characteristic change of the power signal transmitted for detecting the external object may occur due to the object being mounted on the charging pad. When a variance satisfies a designated condition (e.g., when the variance is equal to or greater than a threshold value), the first control circuit 215 may recognize that the object is adjacent. The first control circuit 215 may generate a first ping signal (e.g., an analog ping) according to a designated first period through the power transmission circuit 212. In another example, when the object is identified as being adjacent by the first ping signal, the first control circuit 215 may generate a second ping signal (e.g., a digital ping) according to a designated second period (e.g., a period shorter than the first period) through the power transmission circuit 212. When a response (e.g., a signal strength packet (SSP)) to transmission of the second ping signal is received through the wireless communication circuit 215, the first control circuit 215 may recognize that the adjacent object mounted on the charging pad is the power reception device 202.

In an embodiment, the first control circuit 215 may transmit a data signal to the power reception device 202 through the first wireless communication circuit 214, based on recognizing presence of the power reception device 202. In an example, the data signal may include a detail indicating what information the power supply device 201 requests from the power reception device 202 is and/or information (e.g., identification information about the power supply device 201) requested by the power reception device 202 from the power supply device 201. The information the power supply device 201 requests from the power reception device 202 by transmitting the data signal to the power reception device 202 may include identification information about the power reception device 202 and/or configuration information related to wireless charging. In another embodiment, the identification information may include version information, a manufacturing code, or a device identifier. In still another embodiment, the configuration information may include a wireless charging frequency, maximum receivable power, or power requested from the power supply device 201 for battery charging. The first control circuit 215 may receive the requested information as a response message from the power reception device 202 through the first wireless communication circuit 214. In yet another embodiment, the first control circuit 215 may control the power transmission circuit 212 to transmit a power signal for battery charging, based at least partly on the identification information and/or the configuration information in the received response message.

The first control circuit 215 may receive a feedback signal for controlling power supply from the power reception device 202 through the first coil 213. According to an embodiment, the feedback signal may include a control error packet (CEP) defined in the WPC standard. The control error packet may include a control error value (CEV). For example, the control error value may be an integer (e.g., −1, 0, or +1) ranging from −128 to +127.

While the power transmission circuit 212 transmits the power signal to the power reception device 202 through the first coil 213, the first control circuit 215 may adjust a characteristic (e.g., voltage or current) of the power signal or may terminate transmitting the power signal, based on the feedback signal received from the power reception device 202. In an example, the first control circuit 215 may control the power transmission circuit 211 to increase or reduce the voltage and/or frequency of the power signal, based on an error value (e.g., the CEV included in the CEP) received from the power reception device 202 through the first wireless communication circuit 214. In another example, the error value (e.g., the CEV) may include a value determined by a difference between a rectified voltage (e.g., V REC) rectified by the power reception device 202 and a target voltage designated by the power reception device 202. When the difference between the rectified voltage and the target voltage is within a designated error range, the error value may be configured to "0" by the power reception device 202, and accordingly the first control circuit 215 may maintain the voltage of the power signal unchanged. In an embodiment, the power reception device 202 may transmit a control error packet having a negative control error value to the power supply device 201 in order to request a reduction in the level of charging power. In another embodiment, the power reception device 202 may transmit a control error packet having a positive control error value to the power supply device 201 to request an increase in the level of charging power. For example, when the rectified voltage is smaller than the target voltage (e.g., smaller than a value of the target voltage minus a value representing the error range), the error value may be configured to a positive number (e.g., "+1") by the power reception device 202, and accordingly the first control circuit 215 may increase the power (e.g., voltage) of the power signal input to the first coil 213. When the rectified voltage is greater than the target voltage (e.g., greater than the target voltage plus the value of the error range), the error value may be configured to a negative number (e.g., "−1") by the power reception device 202, and accordingly the first control circuit 215 may reduce the power of the power signal. In still another embodiment, when a termination signal (e.g., a packet (e.g., a CS 100 packet) transmitted by the power reception device 202 when a battery 225 is completely charged) is received from the power reception device 202 through the first coil 213, the first control circuit 215 may control the power transmission circuit 212 to terminate outputting the power signal to the first coil 213.

The power supply device 201 may further include an authentication circuit 217 to support authentication for fast charging. In an embodiment, an authentication operation using the authentication circuit 217 may be started by the power reception device 202 transmitting an authentication request message to the power supply device 201 while the power transmission circuit 212 transmits a power signal having a first power value (e.g., which may be the power value configured in the identification and configuration operation, for example, 4.5 W) to the power reception device 202 through the first coil 213. After charging starts, the power reception device 202 may request device identification information from the power supply device 201, may identify that the power supply device 201 supports fast charging, based on the identification information received from the power supply device 201, and accordingly may transmit an authentication request message to the power supply device 201. In another embodiment, the first control circuit 215 may perform an authentication operation for verifying whether the power reception device 202 is a target for fast charging by using the authentication circuit 217, based on the authentication request message. In an example, the authentication operation may include: an operation in which the power reception device 202 requests a key (e.g., a random number) from the power supply device 201; an operation in which the authentication circuit 217 generates a key and the first control circuit 215 transmits the generated key to the power reception device 202 in response to a key request; an operation in which the power reception device 202 generates a first authentication result value by using the key; an operation in which the power reception device 202 transmits the first authentication result value to the power supply device 201 and requests verification of the first authentication result value; an operation in which the authentication circuit 217 verifies whether the first authentication result value is generated by the key generated by the authentication circuit 217 in response to a verification request; and an operation in which the first control circuit 215 transmits a second authentication result value as a verification result to the power reception device 202. In yet another embodiment, the authentication operation described above is merely one example for fast charging, and the technical idea of the disclosure is not limited to the authentication operation described above.

The first control circuit 215 may transmit a power signal having a designated second power value to the power reception device 202, based on successful authentication. In an example, a power signal having a higher power value (e.g., 12 W or 15 W) than the power value (e.g., the first power value) configured in the identification and configuration operation may be transmitted to the power reception device 202.

According to an embodiment, the first control circuit 215 may be configured together with the first wireless communication circuit 214 as one integrated circuit (IC). In an example, one integrated circuit may be configured to perform control for power supply and wireless communication with the power reception device 202 through the first coil 213.

According to another embodiment, the first control circuit 215 may be configured separately from the first wireless communication circuit 214. For example, the first control circuit 215 may include a microcontroller unit (MCU), and the first wireless communication circuit 214 may include an integrated circuit configured to perform a wireless communication function.

According to yet another embodiment, the power reception device 202 may include the second coil (or power reception coil) 221, a power reception circuit 222, the second wireless communication circuit 223, a charging circuit 224, the battery 225, and a second control circuit (or power reception control circuit) 226.

The second coil 221 may be a spiral coil wound a plurality times in the clockwise or counterclockwise direction. When the power reception device 202 is mounted on the charging pad, the second coil 221 may be substantially aligned with the first coil 213. In an embodiment, the second coil 221 may receive a power signal from the first coil 213 through electrical coupling (or connection) with the first coil 213. The second coil 221 may resonate at the same frequency as the frequency at which the first coil 213 resonates. In another embodiment, the power reception device 202 may further include a resonant circuit 227 to enable the second coil 221 to resonate at the specific frequency (e.g., the frequency specified in the Wireless Power Consortium (WPC) standard). The second coil 221 may be used as an antenna for data communication (e.g., in-band communication) in addition to power reception.

In still another embodiment, the power reception circuit 222 may be configured to transmit the power signal received from the power supply device 201 through the second coil 221 to the charging circuit 224. In an example, the power reception circuit 220 may include a rectifier circuit to convert the current of the power signal from an AC to a DC and a DC-DC converter circuit to convert a rectified voltage (V REC), and may output the power signal to the charging circuit 224.

In yet another embodiment, the second wireless communication circuit 223 may perform data communication with the power supply device 201 through the second coil 221. For example, the second wireless communication circuit 223 may receive a data signal from the second control circuit 226, may load the received data signal onto the power signal received from the power transmission coil 213, and may transmit the power signal to the power supply device 201. As a method for loading the data signal onto the power signal, the foregoing technique of modulating the amplitude and/or frequency of the power signal may be used. In an embodiment, the second wireless communication circuit 223 may demodulate the power signal transmitted from the power transmission coil 213 to the power reception coil 221, thus obtaining a data signal transmitted from the power supply device 201 to the power reception device 202. In another embodiment, the second wireless communication circuit 223 may transmit the obtained data signal to the reception control circuit 226.

The charging circuit 224 may charge the battery 225 by using the power signal received from the second coil 221 through the power reception circuit 222. In an example, the charging circuit 224 may support constant-current (CC) and constant-voltage (CV) charging, based on control of the second control circuit 226. When a charging mode is a CC mode, the charging circuit 224 may constantly maintain the current of the power signal output from the charging circuit 224 to the battery 225 at a charging current value configured by a processor (second control circuit 226) so that the voltage of the battery 225 increases to a designated target voltage value. In another embodiment, when the voltage of the battery 225 reaches the target voltage value and thus the charging mode is changed from the CC mode to a CV mode, the charging circuit 224 may reduce the current of the power signal output from the charging circuit 224 by stages according to control of the second control circuit 226, thereby maintaining the voltage of the battery 225 at the target voltage value. In yet another embodiment, when the current of the power signal input to the battery 225 is reduced to a designated charging completion current value (e.g., a top-off current value) while charging the battery 225 in the CV mode, the charging circuit 224 may terminate outputting the power signal to the battery 225, based on control of the second control circuit 226, thereby completing charging of the battery 225.

The reception control circuit (e.g., the processor 120 of FIG. 1) 226 may perform data communication with the power supply device 201 through the second wireless communication circuit 223. In an embodiment, the second control circuit 226 may control the power reception circuit 222 to receive the power signal through the second coil 221, based on the data communication, and may control the charging circuit 224 to charge the battery 225 by using the received power signal.

In yet another embodiment, the second control circuit 226 may transmit an authentication request message for a switch to a fast charging mode to the power supply device 201 through the wireless communication circuit 223 while the battery 225 is charged by the power signal received from the power supply device 201 in a slow charging mode (or normal charging mode). In the slow charging mode, the power reception circuit 222 may receive a power signal having the first power value through the second coil 221. After authentication is successful, in the fast charging mode, the power reception circuit 222 may receive a power signal having the second power value higher than the first power value through the second coil 221. In still another embodiment, the charging circuit 224 may charge the battery 225 at a high speed by using the power signal received from the power reception circuit 222.

According to one embodiment, when there is no response from the power supply device 201 within a designated time after requesting authentication for fast charging to the power supply device 201, the second control circuit 226 may transmit an authentication request message again. When the power supply device 201 responds to a re-request for authentication, the power reception device 202 may be authenticated. In another embodiment, when an authentication request is performed a designated number of times but there is no response from the power supply device 201, the power reception device 202 may charge the battery 225 in the slow charging mode without requesting authentication any more.

According to another embodiment, the second control circuit 226 may receive a request to make an authentication request again from the power supply device 201 through the second wireless communication circuit 223. The second control circuit 226 may retransmit an authentication request message according to the request. When the power supply device 201 responds to the authentication request, the power reception device 202 may be authenticated.

According to yet another embodiment, when there is no response within the designated time after an authentication request, the second control circuit 226 may restart a wireless charging operation from the beginning. The second control circuit 226 may control the second wireless communication circuit 223 to transmit a termination signal for stopping charging of the battery 225 to the power supply device 201. The power supply device 201 may stop transmitting the power signal according to the termination signal. In another example, charging of the battery 225 may be stopped by the power supply device 201. Subsequently, the wireless charging operation (e.g., the ping operation, the identification and configuration operation, and the power transfer operation) may be resumed between the power supply device 201 and the power reception device 202. After the wireless charging operation is resumed, the second control circuit 226 may transmit an authentication request message to the power supply device 201. In an embodiment, when the power supply device 201 responds to the authentication request message, the power reception device 202 may be authenticated.

Figure 3:
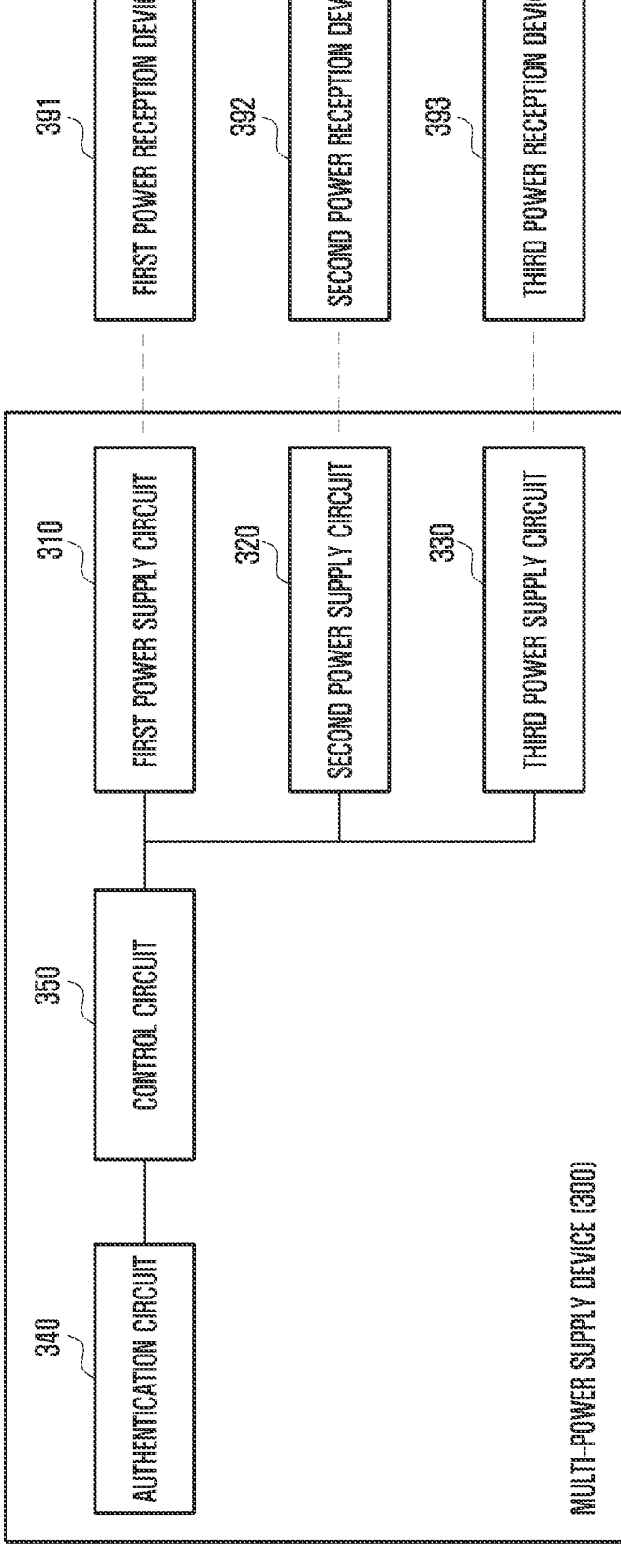
FIG. 3 is a block diagram of a multi-power supply device according to an embodiment of the disclosure.

FIG. 3 is a block diagram of a multi-power supply device 300 according to an embodiment of the disclosure.

Figure 4:
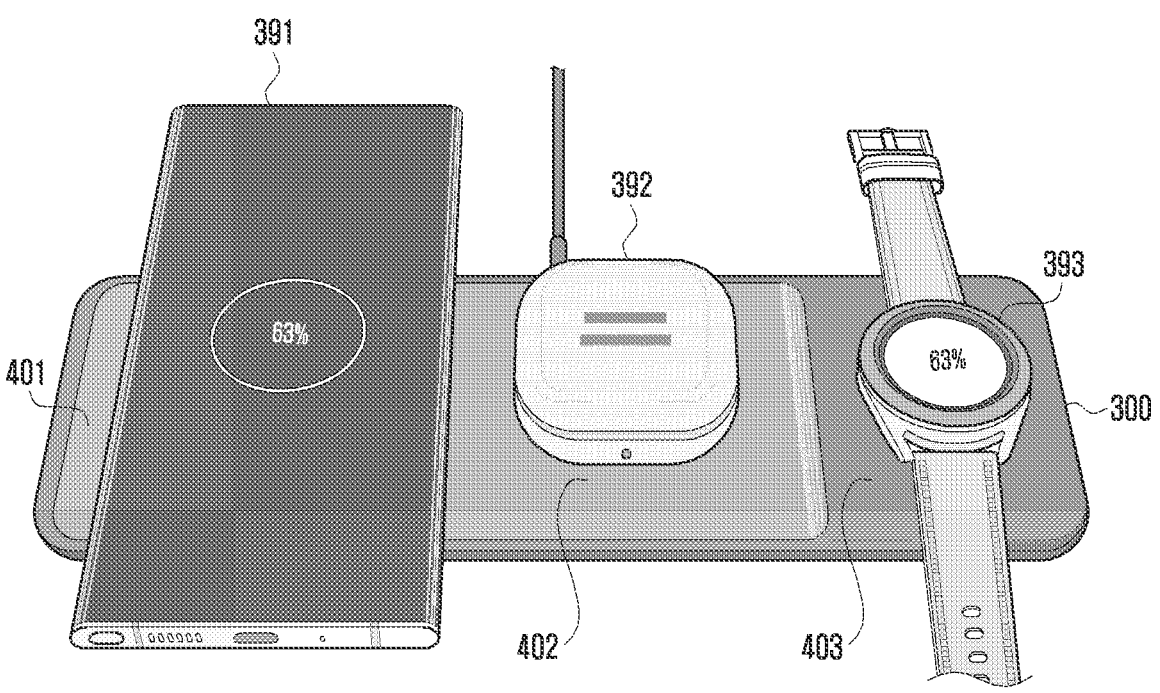
FIG. 4 is a diagram illustrating the appearance of a multi-power supply device according to an embodiment of the disclosure.

FIG. 4 is a diagram illustrating the appearance of a multi-power supply device 300 according to an embodiment of the disclosure. A description overlapping with that made with reference to FIG. 2 is omitted or briefly made.

Referring to FIGS. 3 and 4, the multi-power supply device 300 may include a plurality of charging pads 401, 402, and 403. A multi-power supply device 300 may include as many power supply circuits 310, 320, and 330 as the number of charging pads provided. Each of the power supply circuits 310, 320, and 330 may include components performing at least partly the same functions as those of the components (e.g., a power source circuit 211, a power transmission circuit 212, a first coil 213, a first wireless communication circuit 214, and a resonant circuit 216) of the power supply device 201 described above with reference to FIG. 2. The multi-power supply device 300 may include an authentication circuit 340 (e.g., an authentication circuit 217 of FIG. 2) to support authentication for fast charging. The multi-power supply device 300 may include a control circuit (e.g., a microcontroller unit (MCU)) 350 electrically connected to the power supply circuits 310, 320, and 330 and the authentication circuit 240.

In an embodiment, the control circuit 350 may control sequential authentication operations of power reception devices 391, 392, and 393. For example, the power reception devices 391, 392, and 393 may be mounted on the charging pads 401, 402, and 403, and the charging pads 401, 402, and 403 may correspond to the power supply circuits 310, 320, and 330, respectively. In another embodiment, the power supply circuits 310, 320, and 330 may supply power to the power reception devices mounted on the corresponding charging pads in the slow charging mode. While power is supplied to the power reception devices 391, 392, and 393 in the slow charging mode, the power supply circuits 310, 320, and 330 may receive an authentication request message from the corresponding power reception devices, and may transmit the authentication request message to the control circuit 350. In yet another embodiment, the control circuit 350 may determine an order in authenticating the power reception devices 391, 392, and 393. The control circuit 350 may sequentially process authentication (e.g., first authentication and second authentication described above) according to the determined order by using the authentication circuit 340. After a power reception device determined as a higher priority is completely authenticated, the control circuit 350 may control a corresponding power supply circuit to transmit a request message to a power reception device determined as a next priority in order to ask for an authentication request again. When the power reception device responds to the request message, the power reception device may be authenticated. In another example, the control circuit 350 may receive an authentication request message again from power reception device(s) of lower priorities. In another embodiment, when a power reception device determined as a higher priority is completely authenticated, the control circuit 350 may respond to a power reception device having a higher priority among the devices having re-requested authentication.

According to one embodiment, the control circuit 350 may sequentially process authentication in an order in which authentication requests are made. In an example, a first authentication request message of a first power reception device 391 may be transmitted to the control circuit 350 through a first power supply circuit 310, and then a second authentication request message of a second power reception device 392 may be transmitted to the control circuit 350 through a second power supply circuit 320. The control circuit 350 may first authenticate the first power reception device 391. While the first power reception device 391 is authenticated, the control circuit 350 may control the second power supply circuit 320 to maintain slow charging for the second power reception device 392.

According to another embodiment, the control circuit 350 may sequentially process authentication in an order designated for the wireless charging pads 401, 402, and 403. In an example, priorities may be determined in an order of a first charging pad 401, a second charging pad 402, and a third charging pad 403, and information indicating the priorities may be stored in an internal memory of the control circuit 350. When receiving the first authentication request message and the second authentication request message, the control circuit 350 may first authenticate the first power reception device 391 mounted on the first charging pad 401, based on the stored information about the priorities.

According to yet another embodiment, the control circuit 350 may determine an authentication order, based on identification information about power reception devices having requested authentication, and may sequentially process authentication according to the determined order. For example, priority information based on the type (e.g., a smartphone, a wireless earphone case, or a smartwatch), version, and/or manufacturer of a power reception device may be stored in a memory (not shown) of the multi-power supply device 300 (e.g., the internal memory of the control circuit 350). The priority information may include information indicating that the first power reception device 391, of which the type is a smartphone, is configured to have a higher priority than that of the second power reception device 392, of which the type is a wireless earphone case. In an embodiment, when receiving the first authentication request message and the second authentication request message, the control circuit 350 may first authenticate the first power reception device 391 mounted on the first charging pad 401, based on the stored priority information.

Although FIGS. 3 and 4 show that three power supply circuits and three charging pads corresponding thereto are provided in the multi-power supply device 300, the technical idea of the disclosure is not limited to the number of three. For example, the multi-power supply device 300 may include two pairs of power supply circuits and charging pads or may include four or more pairs of power supply circuits and charging pads.

Figure 5:
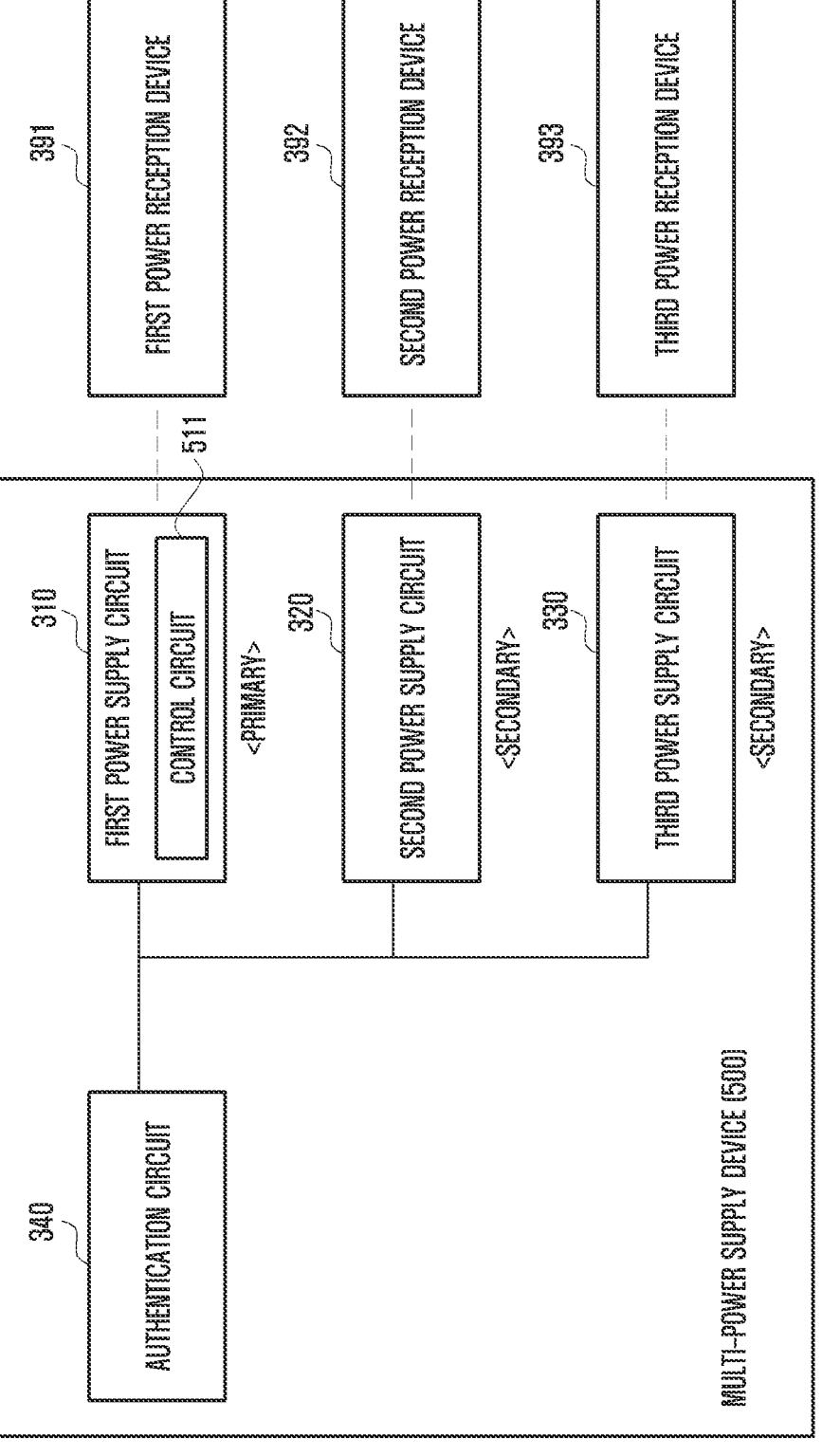
FIG. 5 is a block diagram of a multi-power supply device according to an embodiment of the disclosure.

FIG. 5 is a block diagram of a multi-power supply device 500 according to an embodiment of the disclosure. A description overlapping with that made with reference to FIGS. 2 to 4 is omitted or briefly made.

Referring to FIG. 5, a multi-power supply device 500 may have at least partly the same configuration as that of the multi-power supply device 300 except that a control circuit 350 is omitted. A role of the control circuit 350 may be performed instead by a power supply circuit designated as primary among power supply circuits 310, 320, and 330. In an example, a control circuit 511 to control power supply in a first power supply circuit 310 may control sequential authentication operations of power reception devices 391, 392, and 393. While power is supplied to the power reception devices 391, 392, and 393 in the slow charging mode, the power supply circuits 310, 320, and 330 may receive an authentication request message from the corresponding power reception devices. In an embodiment, a second power supply circuit 320 and a third power supply circuit 330 designated as secondary may transmit an authentication request message to the first power supply circuit 310 designated as primary. The control circuit 511 may determine an order in authenticating the power reception devices 391, 392, and 393. In another embodiment, the control circuit 511 may sequentially process authentication (e.g., first authentication and second authentication described above) according to the determined order by using an authentication circuit 340.

According to one embodiment, the control circuit 511 may be configured together with a wireless communication circuit of the first power supply circuit 310 as one integrated circuit (IC). One integrated circuit may be configured to perform control for power supply and wireless communication with a power reception device through a coil of the first power supply circuit 310.

According to another embodiment, the control circuit 511 may be configured separately from the wireless communication circuit of the first power supply circuit 310. For example, the control circuit 511 may include a microcontroller unit (MCU), and the wireless communication circuit of the first power supply circuit 310 may include an integrated circuit configured to perform a wireless communication function.

According to still another embodiment, the control circuit 511 may sequentially process authentication in an order in which authentication requests are made.

According to yet another embodiment, the control circuit 511 may sequentially process authentication in an order designated for wireless charging pads 401, 402, and 403. In an example, a first charging pad 401 corresponding to the first power supply circuit 310 designated as primary may be determined as a highest priority, and one of a second charging pad 402 and a third charging pad 403 may be determined as a next priority. Information indicating the priorities may be stored in an internal memory of the control circuit 511, and the control circuit 511 may sequentially process authentication, based on the stored information about the priorities.

In an embodiment, the control circuit 511 may determine an authentication order, based on identification information about power reception devices having requested authentication, and may sequentially process authentication according to the determined order.

Figure 6:
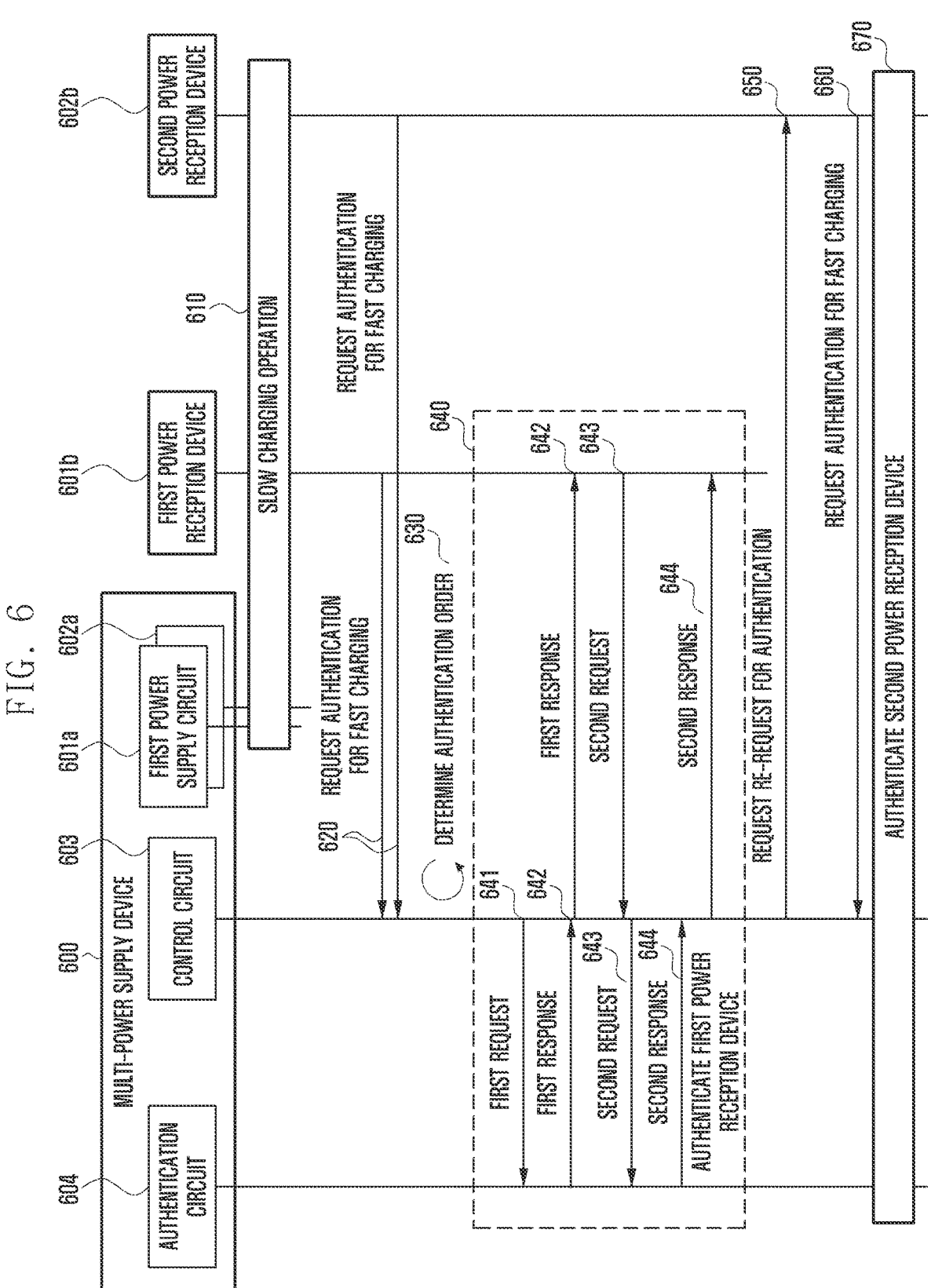
FIG. 6 is a flowchart illustrating a sequential authentication processing method in a wireless charging system according to an embodiment of the disclosure.

FIG. 6 is a flowchart illustrating a sequential authentication processing method in a wireless charging system according to an embodiment of the disclosure. A description overlapping with that made with reference to FIGS. 2 to 5 is omitted or briefly made. In an example, a multi-power supply device indicated by reference numeral 600 in FIG. 6 may be the multi-power supply device 300 of FIG. 3 or the multi-power supply device 500 of FIG. 5. Therefore, a description of component of the multi-power supply device overlaps with that described with reference to FIGS. 2 to 5, and may thus be omitted.

Referring to FIG. 6, in operation 610, power supply circuits of a multi-power supply device 600 may perform a slow charging operation with power reception devices. For example, a first power supply circuit 601*a* may configure a power value through data communication (e.g., in-band communication) with a first power reception device 601*b*, and may transmit a power signal having the configured power value to the first power reception device 601*b*. In an embodiment, a second power supply circuit 602*a* may configure a power value through data communication with a second power reception device 602*b*, and may transmit a power signal having the configured power value to the second power reception device 601*b*.

In operation 620, a control circuit 603 of the multi-power supply device 600 may receive an authentication request message for fast charging from the power reception devices (e.g., the first power reception device 601*b* and the second power reception device 602*b*) which are charged at a low speed through the power supply circuits.

In operation 630, the control circuit 603 may determine an order for processing authentication. In an example, the control circuit 603 may determine an authentication order according to a chronological order in which authentication request messages are received. In another example, the control circuit 603 may determine an authentication order according to an order designated for charging pads. In still another example, the control circuit 603 may determine an authentication order, based on identification information about power reception devices having requested authentication.

In operation 640, the control circuit 603 may relay an exchange of data signals between an authentication circuit 604 and the first power reception device 601*b* to authenticate the first power reception device 601*b* determined as a target to be authenticated first (first priority). In an example, the control circuit 603 may request a key from the authentication circuit 604 as a first request 641 corresponding to an authentication request of the first power reception device 601*b*. As a first response 642 to the request, the authentication circuit 604 may generate a key, and may provide the key to the control circuit 603. The control circuit 603 may transmit the key to the first power reception device 601*b* as the first response 642 of the authentication circuit 604 to the authentication request of the first power reception device 601*b*. In an embodiment, the first power reception device 601*b* may generate a first authentication result value by using the received key. In another embodiment, the first power reception device 601*b* may transmit the first authentication result value to the control circuit 603 as a second request 643 for requesting verification of the first authentication result value. The control circuit 603 may transmit the first authentication result value to the authentication circuit 604 as the second request 643 of the first power reception device 601*b*. In yet another embodiment, the authentication circuit 604 may verify whether the first authentication result value received from the first power reception device 601*b* through the control circuit 603 is generated by a key generated by the authentication circuit 604. In still another embodiment, the authentication circuit 604 may provide a verification result value (second authentication result value) to the control circuit 603 as a second response 644 to the second request 643. The control circuit 603 may transmit the verification result value to the first power reception device 601*b* as the second response 644 of the authentication circuit

604. When the verification result is successful authentication, the control circuit 603 may control the first power supply circuit 601*a* to perform fast charging of the power reception device 601*b*.

In an embodiment, when the first power reception device 601*b* is completely authenticated, the control circuit 603 may transmit a message for requesting the second power reception device 602*b* determined as a target to be authenticated secondly (second priority) to make an authentication request again through the second power supply circuit 602*a* in operation 650.

In operation 660, the control circuit 603 may receive an authentication request message from the second power reception device 602*b* as a response of the second power reception device 602*b* to operation 650.

In operation 670, the control circuit 603 may authenticate the second power reception device 602*b* by using the authentication circuit 604. In an embodiment, the second power reception device 602*b* may be authenticated by at least partly the same operation as in authentication of the first power reception device 601*b*.

Figure 7:
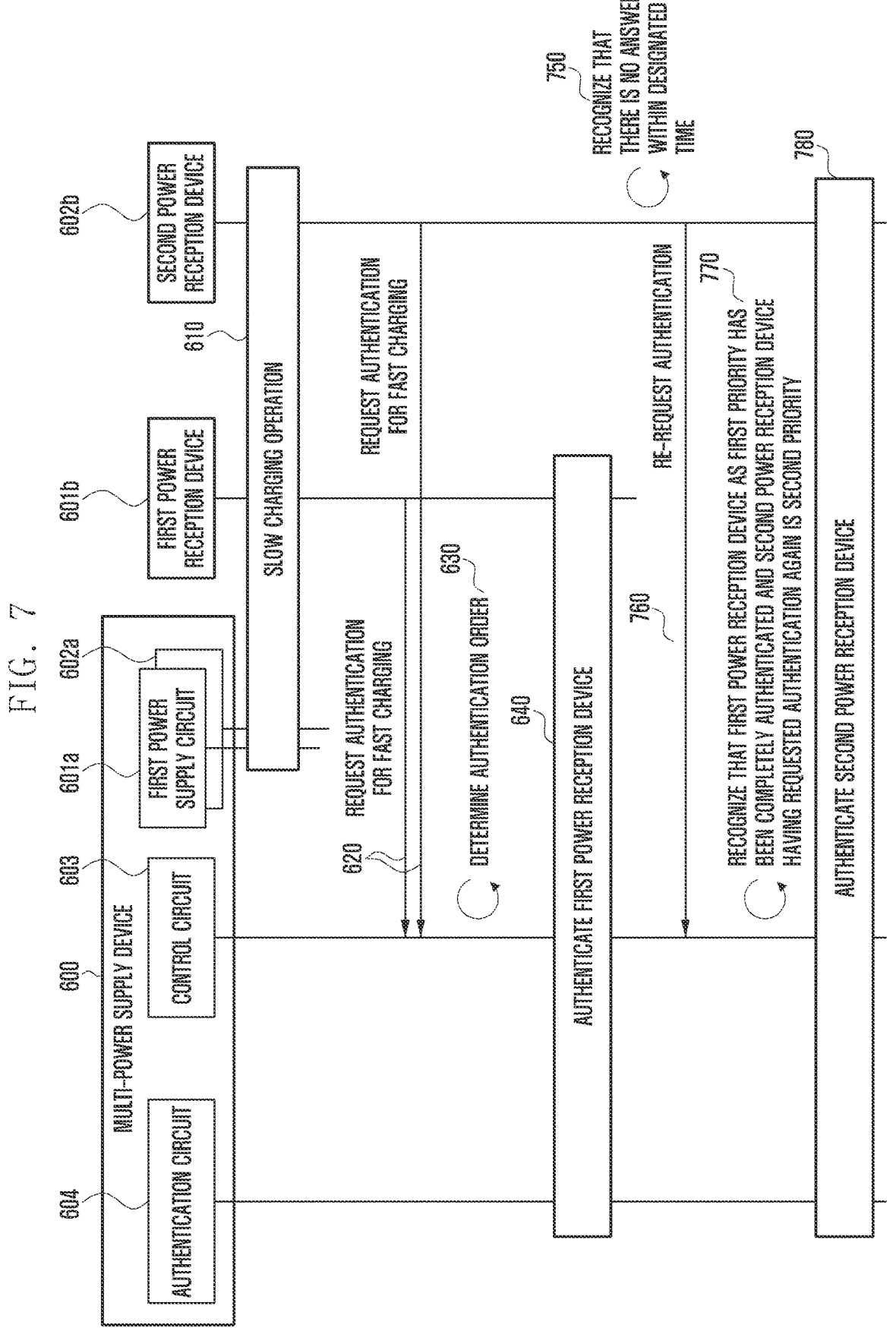
FIG. 7 is a flowchart illustrating a sequential authentication processing method in a wireless charging system according to an embodiment of the disclosure.

FIG. 7 is a flowchart illustrating a sequential authentication processing method in a wireless charging system according to an embodiment of the disclosure. Since operations 610 to 640 in FIG. 7 are indicated by the same reference numerals as those of corresponding operations in FIG. 6 and are the same as the corresponding operations in FIG. 6, a description thereof is omitted.

In operation 750, a second power reception device 602*b* may recognize that there is no response from a multi-power supply device 600 within a designated time after requesting authentication from the multi-power supply device 600. The second power reception device 602*b* may count the designated time from a time of requesting authentication from the multi-power supply device 600. In another embodiment, the second power reception device 602*b* may terminate counting the time when there is a response from the multi-power supply device 600 before the designated time expires. In yet another embodiment, when the designated time expires and there is no response from the multi-power supply device 600, the second power reception device 602*b* may retransmit an authentication request message to the multi-power supply device 600.

In operation 760, the control circuit 603 may receive the authentication request message again from the second power reception device 602*b* through the second power supply circuit 602*a*.

In operation 770, the control circuit 603 may recognize that the first power reception device 601*b* determined as the first priority has been completely authenticated and the second power reception device 602*b* having requested authentication again is a target to be authenticated secondly (second priority).

In operation 780, the control circuit 603 may authenticate the second power reception device 602*b* by using the authentication circuit 604, based on recognizing that the first power reception device 601*b* has been completely authenticated and the second power reception device 602*b* is the second priority.

In an embodiment, when the second power reception device 602*b* is a third priority and a third power reception device (not shown) having requested authentication again is a second priority, the control circuit 603 may respond to a re-request for authentication from the third power reception device as the second priority, and may not respond to the second power reception device 602*b*. In another embodiment, when the third power reception device is completely authenticated and there is still another authentication request from the second power reception device 602b, the control circuit 603 may authenticate the second power reception device 602b.

Figure 8:
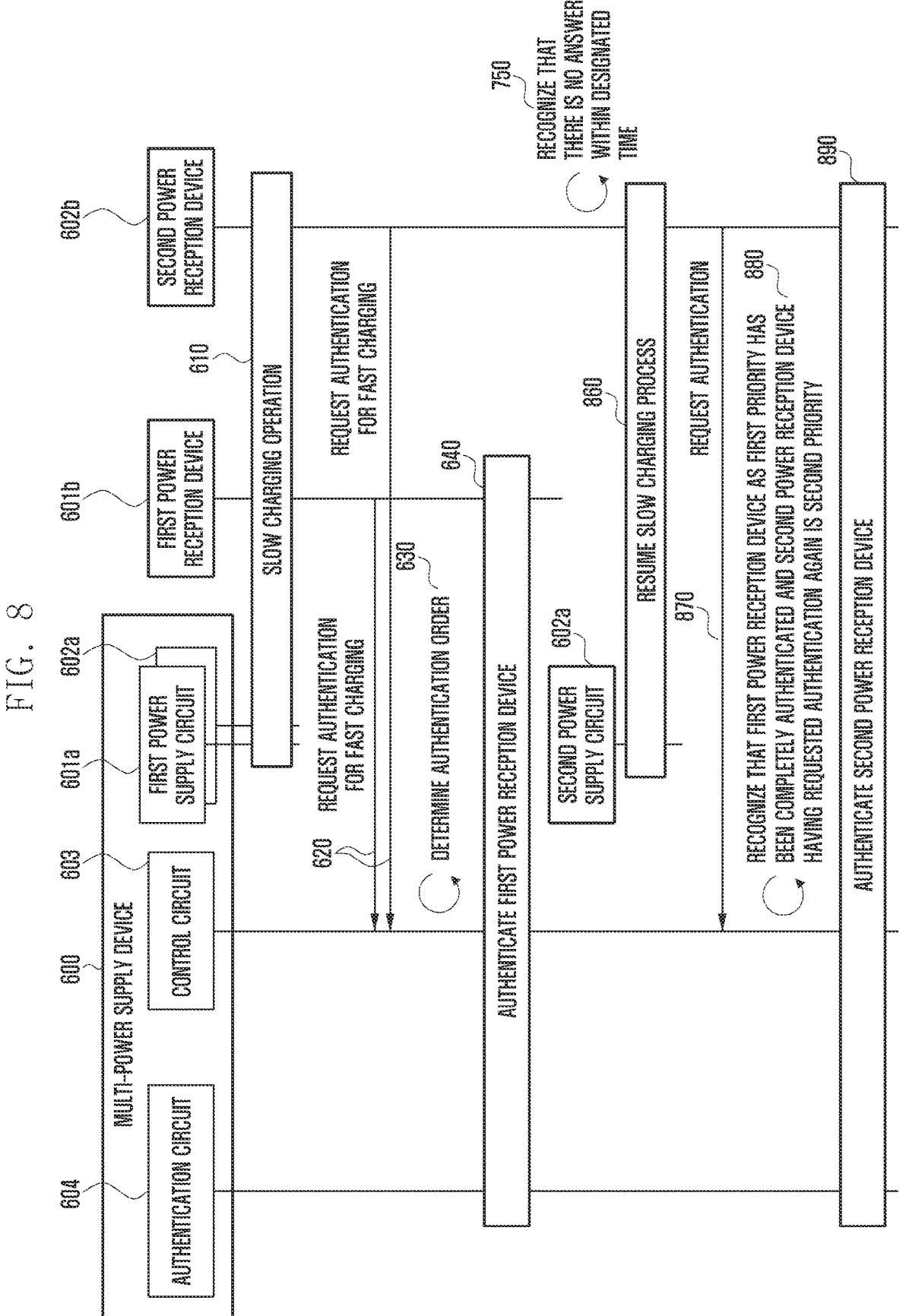
FIG. 8 is a flowchart illustrating a sequential authentication processing method in a wireless charging system according to an embodiment of the disclosure.

FIG. 8 is a flowchart illustrating a sequential authentication processing method in a wireless charging system according to an embodiment of the disclosure. Since operations 610 to 640 in FIG. 8 are indicated by the same reference numerals as those of corresponding operations in FIG. 6 and are the same as the corresponding operations in FIG. 6, a description thereof is omitted. Further, since operation 750 is the same as a corresponding operation in FIG. 7, a description thereof is omitted.

In an embodiment, when there is no response within the designated time after an authentication request, a slow charging operation between a second power supply circuit 602a and a second power reception device 602b may be resumed in operation 860. For example, when there is no response within the designated time after the authentication request, the second power reception device 602b may transmit a request message for stopping charging to a second power supply circuit 602. Upon receiving the request message, the second power supply circuit 602 may stop transmitting a power signal. Subsequently, the second power supply circuit 602a may start transmitting a signal (e.g., a ping signal) to search for the second power reception device 602b, thereby resuming the slow charging operation with the second power reception device 602b.

Slow charging of the second power reception device 602b may be stopped by the control circuit 603. As the first power reception device 601a is determined as the target to be authenticated first, the control circuit 603 may control the second power supply circuit 602a to stop transmitting a power signal to the second power reception device 602b which has a lower priority. In an embodiment, when the control circuit 603 is an entity to determine whether to stop transmitting a power signal, operation 750 may be omitted.

Referring to FIG. 8, in operation 870, the control circuit 603 may receive an authentication request message for fast charging from the second power reception device 602b, of which slow charging has been resumed, through the second power supply circuit 602a.

In operation 880, the control circuit 603 may recognize that the first power reception device 601b as the first priority has been completely authenticated and the second power reception device 602b having requested authentication is a target to be authenticated secondly (second priority).

In operation 890, the control circuit 603 may authenticate the second power reception device 602b by using the authentication circuit 604, based on recognizing that the first power reception device 601b has been completely authenticated and the second power reception device 602b is the second priority.

FIG. 9 is a flowchart illustrating operations of a multi-power supply device according to an embodiment of the disclosure. In an embodiment, the multi-power supply device may include n power supply circuits (e.g., the power supply circuits 310, 320, and 330), n charging pads (e.g., the charging pads 401, 402, and 403) respectively corresponding to the power supply circuits, a control circuit (e.g., a control circuit 350 or a control circuit 511), and an authentication circuit (e.g., an authentication circuit 340). The following operations may be performed by the control circuit.

Referring to FIG. 9, in operation 910, the control circuit of the multi-power supply device may receive a first authentication request message for requesting authentication for fast charging from the n (where n is 2 or greater) power reception devices through the n power supply circuits while slow charging of the n power reception devices is performed by the n power supply circuits.

In operation 920, the control circuit of the multi-power supply device may determine an order of a first target to be authenticated to an nth target to be authenticated in response to the first authentication request message being received from the n power reception devices. In an embodiment, an authentication order may be determined according to an order in which first authentication request messages are received. Alternatively, an authentication order may be determined according to an order designated for the charging pads. In another embodiment, an authentication order may be determined based on identification information about the power reception devices.

In operation 930, the control circuit of the multi-power supply device may relay an exchange of data signals between the authentication circuit and a first power reception device, which is determined to be authenticated first among the n power reception devices, to authenticate the first power reception device.

In operation 940, upon completely authenticating an $(m-1)$th $(2 \leq m \leq n)$ power reception device and receiving a second authentication request message from an mth power reception device determined to be authenticated mth, the control circuit of the multi-power supply device may relay an exchange of data signals between the authentication circuit and the mth power reception device to authenticate the mth power reception device.

FIG. 10 is a flowchart illustrating operations of a multi-power supply device according to an embodiment of the disclosure. In an embodiment, the multi-power supply device may include n power supply circuits (e.g., power supply circuits 310, 320, and 330), n charging pads (e.g., charging pads 401, 402, and 403) respectively corresponding to the power supply circuits, a control circuit (e.g., a control circuit 350 or a control circuit 511), and an authentication circuit (e.g., an authentication circuit 340). The following operations may be performed by the control circuit.

Referring to FIG. 10, in operation 1010, the control circuit of the multi-power supply device may receive a first authentication request message for requesting authentication for fast charging from a first power reception device and a second power reception device through a first power supply circuit and a second power supply circuit while slow charging of the first power reception device and the second power reception device is performed by the first power supply circuit and the second power supply circuit.

In operation 1020, the control circuit of the multi-power supply device may determine an authentication order in response to receiving the first authentication request message from the first power reception device and the second reception device. In an embodiment, the authentication order may be determined according to an order in which the first authentication request messages are received. Alternatively, an authentication order may be determined according to an order designated for the charging pads. In another embodiment, an authentication order may be determined based on identification information about the power reception devices.

In operation 1030, the control circuit of the multi-power supply device may relay an exchange of data signals between the authentication circuit and the first power reception device, which is determined to be authenticated first, to authenticate the first power reception device. Further, the control circuit may control the second power supply circuit to stop slow charging of the second power reception device determined to be authenticated secondly.

For example, after the low charging of the second power reception device is resumed by the second power supply circuit, the control circuit of the multi-power supply device may receive a second authentication request message from the second power reception device in operation 1040.

In operation 1050, upon completely authenticating the first power reception device and receiving the second authentication request message from the second power reception device, the control circuit of the multi-power supply device may relay an exchange of data signals between the authentication circuit and the second power reception device to authenticate the second power reception device.

Figure 11:
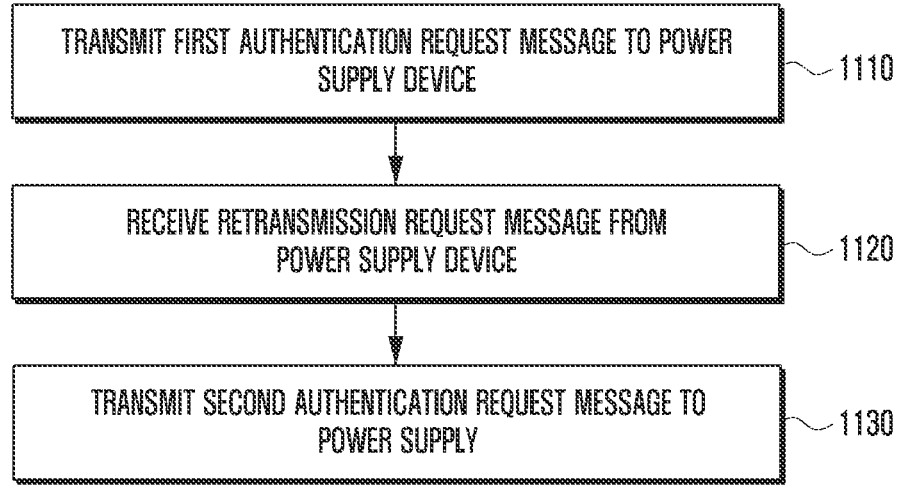
FIG. 11 is a flowchart illustrating operations of a power reception device according to an embodiment of the disclosure.

FIG. 11 is a flowchart illustrating operations of a power reception device (e.g., one of power reception devices 391, 392, and 393) according to an embodiment of the disclosure. In an embodiment, the power reception device may include a battery (e.g., a battery 225), a charging circuit (e.g., a charging circuit 224), a power reception circuit (e.g., a power reception circuit 222), a wireless communication circuit (e.g., a second wireless communication circuit 223), and a control circuit (e.g., a second control circuit 226). The following operations may be performed by the control circuit.

Referring to FIG. 11, in operation 1110, the control circuit of the power reception device may transmit a first authentication request message for requesting authentication for fast charging to a power supply device through the communication circuit in response to identifying that the power supply device supports fast charging from identification information about the power supply device received through the communication circuit while slow charging of the battery is performed with a power signal received from the power supply device.

In operation 1120, after transmitting the first authentication request message, the control circuit of the power reception device may receive a retransmission request message for requesting a re-request for authentication from the power supply device through the communication circuit.

In operation 1130, the control circuit of the reception device may transmit a second authentication request message to the power supply device through the communication circuit in response to the retransmission request message.

Figure 12:
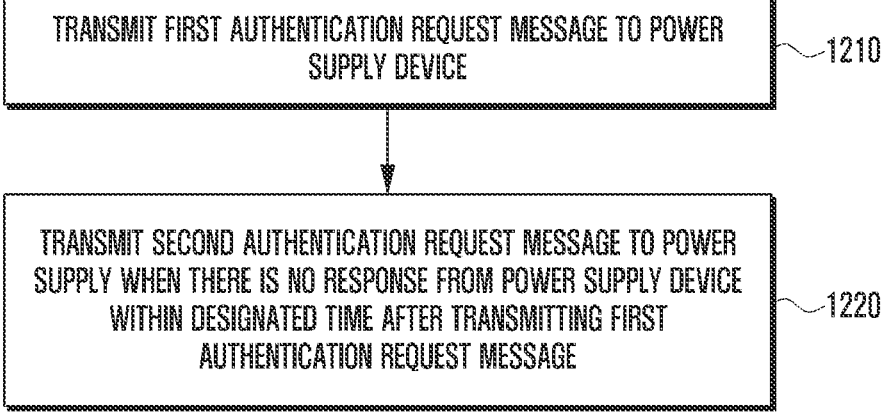
FIG. 12 is a flowchart illustrating operations of a power reception device according to an embodiment of the disclosure.

FIG. 12 is a flowchart illustrating operations of a power reception device (e.g., one of power reception devices 391, 392, and 393) according to an embodiment of the disclosure. In an embodiment, the power reception device may include a battery (e.g., a battery 225), a charging circuit (e.g., a charging circuit 224), a power reception circuit (e.g., a power reception circuit 222), a wireless communication circuit (e.g., a second wireless communication circuit 223), and a control circuit (e.g., a second control circuit 226). The following operations may be performed by the control circuit.

Referring to FIG. 12, in operation 1210, the control circuit of the power reception device may transmit a first authentication request message for requesting authentication for fast charging to a power supply device through the communication circuit in response to identifying that the power supply device supports fast charging from identification information about the power supply device received through the communication circuit while slow charging of the battery is performed with a power signal received from the power supply device.

In operation 1220, the control circuit of the power reception device may identify that there is no response from the power supply device within a designated time after transmitting the first authentication request message, and accordingly may transmit a second authentication request message to the power supply device through the communication circuit.

According to one embodiment, a power supply device may include: an authentication circuit; power supply circuits; and a control circuit connected to the authentication circuit and the power supply circuits. Each of the power supply circuits may include a coil and a communication circuit and may be configured to transmit a power signal to one power reception device through the coil. The control circuit (e.g., the control circuit 350, the control circuit 511, or the control circuit 603) may be configured to transmit and receive a data signal to and from the one power reception device through the communication circuit. In an embodiment, the control circuit may receive a first authentication request message for fast charging from a first power reception device and a second power reception device. The control circuit may determine the first power reception device as a target to be authenticated first and the second power reception device as a target to be authenticated second, based on receiving the first authentication request message from the first power reception device and the second power reception device. In another embodiment, the control circuit may relay an exchange of a data signal between the authentication circuit and the first power reception device to authenticate the first power reception device. The control circuit may transmit a message for requesting transmission of a second authentication request message for fast charging to the second power reception device while maintaining transmission of a power signal from a power supply circuit to the second power reception device, based on completely authenticating the first power reception device. In still another embodiment, the control circuit may relay an exchange of a data signal between the authentication circuit and the second power reception device to authenticate the second power reception device, based on receiving the second authentication request message from the second power reception device.

In still another embodiment, the control circuit may be included in a power supply circuit designated as primary among a plurality of power supply circuits configured in the power supply device.

The control circuit may determine an authentication order according to a chronological order in which the first authentication request message is received from the first power reception device and the second power reception device.

Charging pads (e.g., the charging pads 401, 402, and 403) which correspond to the respective power supply circuits and which power reception devices are respectively mounted on may be provided. In an embodiment, the control circuit may determine an authentication order according to an order designated for the charging pads.

The control circuit may determine an authentication order, based on identification information about the first power reception device and the second power reception device.

In an embodiment, the control circuit may include a microcontroller unit (MCU).

According to one embodiment, a power reception device (e.g., the power reception device 202 or the second power reception device 602*b* of FIG. 6) may include: a battery; a charging circuit configured to charge the battery; a coil; a power reception circuit configured to transmit a power signal received from a power supply device through the coil to the charging circuit; a communication circuit configured to perform data communication with the power supply device through the coil; and a control circuit configured to be connected to the charging circuit, the power reception circuit, and the communication circuit. In another embodiment, the control circuit may transmit a first authentication request message for requesting authentication for fast charging to the power supply device through the communication circuit, based on identifying that the power supply device supports fast charging from identification information about the power supply device received through the communication circuit. The control circuit may receive a retransmission request message for requesting a re-request for authentication from the power supply device through the communication circuit after transmitting the first authentication request message. In yet another embodiment, the control circuit may transmit a second authentication request message to the power supply device through the communication circuit in response to the retransmission request message.

According to one embodiment, a power reception device (e.g., the power reception device 202 or the second power reception device 602*b* of FIG. 7) may include: a battery; a charging circuit configured to charge the battery; a coil; a power reception circuit configured to transmit a power signal received from a power supply device through the coil to the charging circuit; a communication circuit configured to perform data communication with the power supply device through the coil; and a control circuit configured to be connected to the charging circuit, the power reception circuit, and the communication circuit. In yet another embodiment, the control circuit may transmit a first authentication request message for requesting authentication for fast charging to the power supply device through the communication circuit, based on identifying that the power supply device supports fast charging from identification information about the power supply device received through the communication circuit. The control circuit may transmit a second authentication request message to the power supply device through the communication circuit when there is no response from the power supply device within a designated time after transmitting the first authentication request message.

According to another embodiment, a power supply device may include an authentication circuit and power supply circuits, each of the power supply circuits may include a coil and a communication circuit and may be configured to transmit a power signal to one power reception device through the coil, and a method for operating the power supply device may include receiving a first authentication request message for fast charging from a first power reception device through a communication circuit of a first power supply circuit among the power supply circuits and from a second power reception device through a communication circuit of a second power supply circuit. The method may include determining the first power reception device as a target to be authenticated first and the second power reception device as a target to be authenticated second, based on receiving the first authentication request message from the first power reception device and the second power reception device. The method may include relaying an exchange of a data signal between the authentication circuit and the first power reception device to authenticate the first power reception device. The method may include transmitting a message for requesting transmission of a second authentication request message for fast charging to the second power reception device while maintaining transmission of a power signal from the second power supply circuit to the second power reception device, based on completely authenticating the first power reception device. The method may include relaying an exchange of a data signal between the authentication circuit and the second power reception device to authenticate the second power reception device, based on receiving the second authentication request message from the second power reception device.

The determining may include determining an authentication order according to a chronological order in which the first authentication request message is received from the first power reception device and the second power reception device.

Charging pads which correspond to the respective power supply circuits and which power reception devices are respectively mounted on may be provided. The determining may include determining an authentication order according to an order designated for the charging pads.

The determining may include determining an authentication order, based on identification information about the first power reception device and the second power reception device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A power supply device comprising:
   an authentication circuit;
   power supply circuits; and
   a control circuit configured to be connected to the authentication circuit and the power supply circuits,
   wherein each of the power supply circuits comprises a coil and a communication circuit,
   wherein each of the power supply circuits is configured to transmit a power signal to an external power reception device through the coil, and
   wherein the control circuit is configured to:
      while transmitting the power signal to a first power reception device and a second power reception device, send a first message for requesting authentication to the first power reception device and the second power reception device,
      based on sending the first message, receive, through a first communication circuit, a first authentication request message for fast charging from the first power reception device and receive, through a second communication circuit, a second authentication request message from a second power reception device,
      determine the first power reception device as a first target to be authenticated and the second power reception device as a second target to be authenticated,
      based on the first authentication request message, authenticate the first power reception device by relaying an exchange of a data signal between the authentication circuit and the first power reception device,
      based on completely authenticating the first power reception device, send through the second communication circuit, a second message for requesting authentication to the second power reception device while maintaining transmission of the power signal from a second power supply circuit to the second power reception device, based on sending the second message, receive, through the second communication circuit, a third authentication request message from the second power reception device, and based on the third authentication request message, authenticate the second power reception device by relaying an exchange of a data signal between the authentication circuit and the second power reception device.

2. The power supply device of claim 1, wherein the control circuit is included in a power supply circuit designated as primary among a plurality of the power supply circuits configured in the power supply device.

3. The power supply device of claim 1, wherein the control circuit is further configured to determine an authentication order according to a chronological order in which the first authentication request message and the second authentication request message are received from the first power reception device and the second power reception device respectively.

4. The power supply device of claim 1, wherein charging pads which correspond to the power supply circuits and on which the first and second power reception devices are respectively mounted on are provided, and wherein the control circuit is configured to determine an authentication order according to an order designated for the charging pads.

5. The power supply device of claim 1, wherein the control circuit is further configured to determine an authentication order, based on identification information about the first power reception device and the second power reception device.

6. The power supply device of claim 1, wherein the control circuit includes a microcontroller unit (MCU).

7. A power reception device comprising:

a battery;

a charging circuit configured to charge the battery;

a coil;

a power reception circuit configured to transmit a power signal received from a power supply device through the coil to the charging circuit;

a communication circuit configured to perform data communication with the power supply device through the coil; and a control circuit configured to be connected to the charging circuit, the power reception circuit, and the communication circuit, wherein the control circuit is configured to:

transmit a first authentication request message for requesting authentication for fast charging to the power supply device through the communication circuit, based on identifying that the power supply device supports fast charging from identification information about the power supply device received through the communication circuit, receive a retransmission request message for requesting a re-request for authentication from the power supply device through the communication circuit after transmitting the first authentication request message, and transmit a second authentication request message to the power supply device through the communication circuit in response to the retransmission request message.

8. A power reception device comprising:

a battery;

a charging circuit configured to charge the battery;

a coil;

a power reception circuit configured to transmit a power signal received from a power supply device through the coil to the charging circuit;

a communication circuit configured to perform data communication with the power supply device through the coil; and a control circuit configured to be connected to the charging circuit, the power reception circuit, and the communication circuit, wherein the control circuit is configured to:

transmit a first authentication request message for requesting authentication for fast charging to the power supply device through the communication circuit, based on identifying that the power supply device supports fast charging from identification information about the power supply device received through the communication circuit, and transmit a second authentication request message to the power supply device through the communication circuit in case that there is no response from the power supply device within a designated time after transmitting the first authentication request message.

9. A method for operating a power supply device, the power supply device comprising an authentication circuit and power supply circuits, each of the power supply circuits comprising a coil and a communication circuit and being configured to transmit a power signal to an external power reception device through the coil, the method comprising:

while transmitting the power signal to a first power reception device and a second power reception device, sending a first message for requesting authentication to the first power reception device and the second power reception device, based on sending the first message, receiving, through a first communication circuit, a first authentication request message for fast charging from the first power reception device and receive, through a second communication circuit, a second authentication request message from a second power reception device, determining the first power reception device as a first target to be authenticated and the second power reception device as a second target to be authenticated, based on the first authentication request message, authenticating the first power reception device by relaying an exchange of a data signal between the authentication circuit and the first power reception device, based on completely authenticating the first power reception device, sending, through the second communication circuit, a second message for requesting authentication to the second power reception device while maintaining transmission of the power signal from a second power supply circuit to the second power reception device, based on sending the second message, receiving, through the second communication circuit, a third authentication request message from the second power reception device, and based on the third authentication request message, authenticating the second power reception device by relaying an exchange of a data signal between the authentication circuit and the second power reception device.

10. The method of claim 9, wherein the determining comprises determining an authentication order according to a chronological order in which the first authentication request message and the second authentication request message are received from the first power reception device and the second power reception device respectively.

11. The method of claim 9, wherein charging pads which correspond to the power supply circuits and on which the first and second power reception devices are respectively mounted on are provided, and wherein the determining comprises determining an authentication order according to an order designated for the charging pads.

12. The method of claim 9, wherein the determining comprises determining an authentication order, based on identification information about the first power reception device and the second power reception device.

13. The method of claim 9, wherein the receiving of the first authentication request message for the fast charging comprises:

while the power supply device supplies power to the first power reception device and the second power reception device in a slow charging mode, receiving authentication request messages from the first power reception device and the second power reception device.

\* \* \* \* \*